July 22, 1924.
J. S. GABKE
1,502,303
STEERING DEVICE FOR PEDACYCLES
Filed June 5, 1923
2 Sheets-Sheet 2
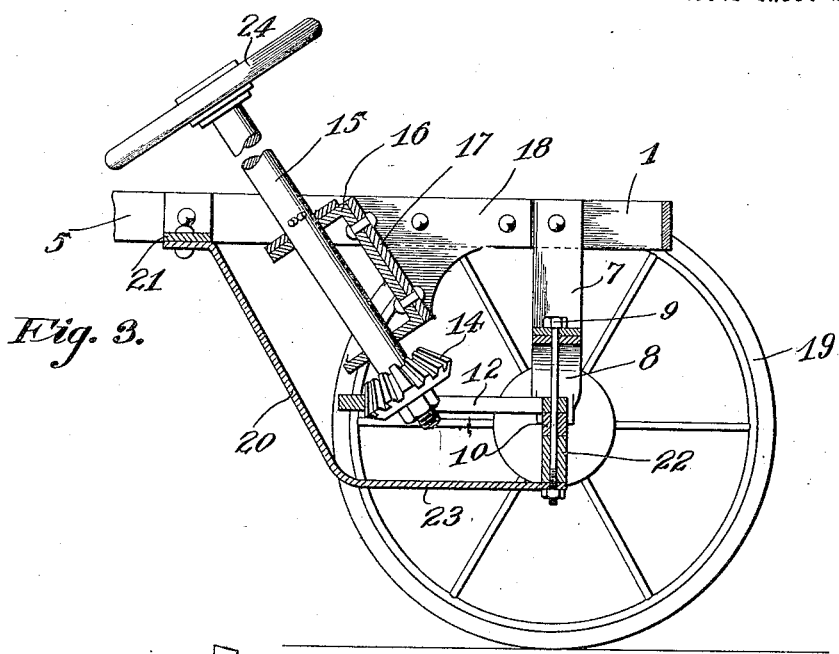
Fig. 3.
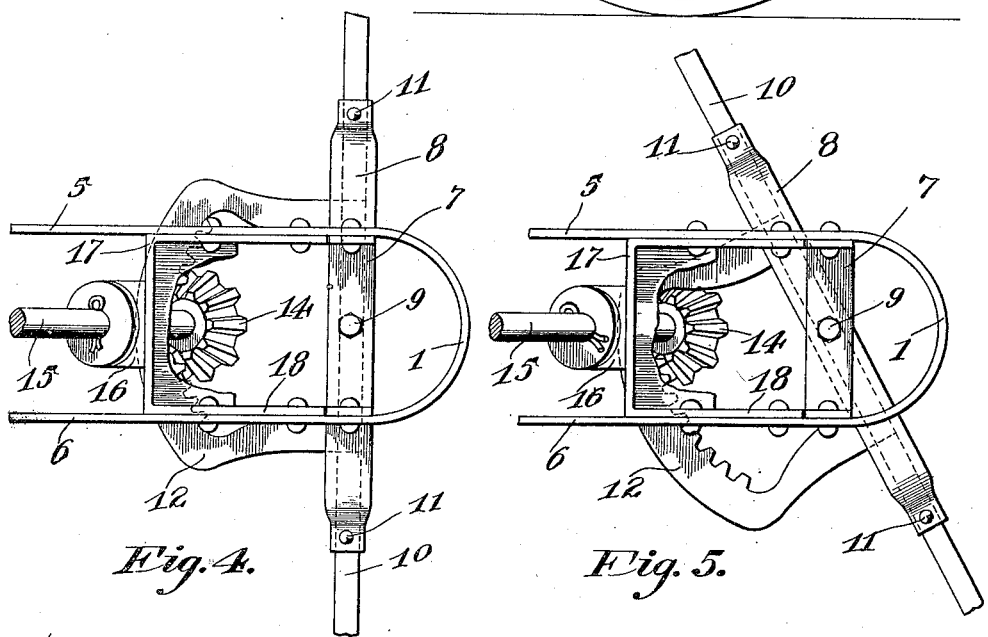
Fig. 4.
Fig. 5.
Witnesses:
Inventor
John S. Gabke
By Joshua R. H. Potts
his Attorney Patented July 22, 1924.

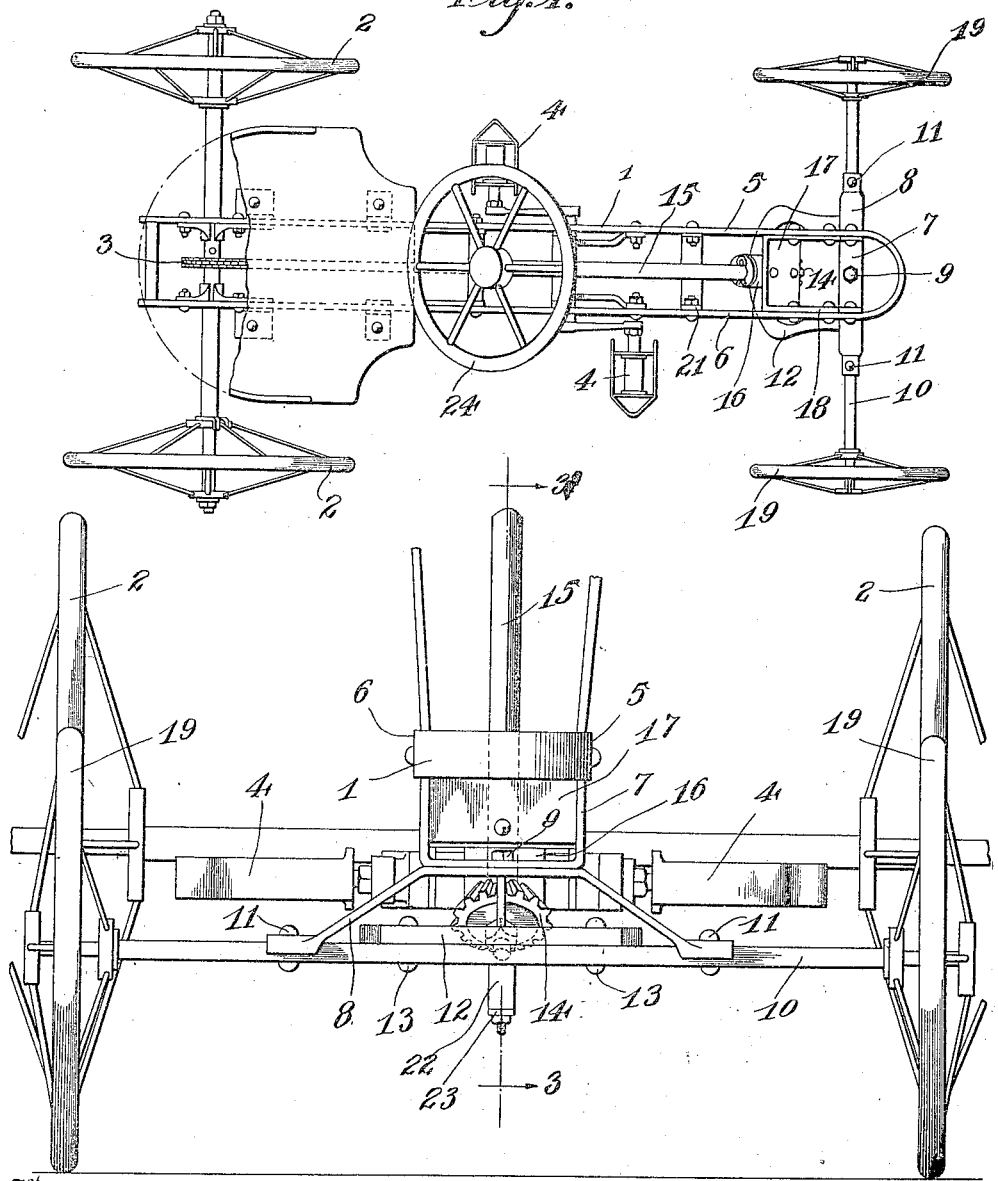

1,502,303

UNITED STATES PATENT OFFICE.

JOHN S. GABKE, OF WILMINGTON, DELAWARE.

STEERING DEVICE FOR PEDACYCLES.

Application filed June 5, 1923. Serial No. 643,539.

*To all whom it may concern:*

Be it known that I, JOHN S. GABKE, a citizen of the United States, residing at Wilmington, in the county of New Castle and State of Delaware, have invented certain new and useful Improvements in Steering Devices for Pedacycles, of which the following is a specification.

My invention relates to steering devices which are particularly adapted for use on pedacycles. The objects are to provide a steering device which will facilitate the steering of a pedacycle; be simple, strong and durable in its construction; easily assembled and cheap to manufacture.

These objects, and other advantageous ends which will be described hereinafter, I attain in the following manner, reference being had to the accompanying drawings in which—

Figure 1 is a plan view of a pedacycle having my steering device applied thereto, Figure 2 an enlarged fragmentary front view of Figure 1, Figure 3 a section on line 3—3 of Figure 2, Figure 4 a framentary plan view of Figure 3 partly broken away illustrating the gear and rack connection, and Figure 5 a view similar to Figure 4 illustrating the axle moved in another position.

Referring to the drawings, 1 indicates a frame, 2 the rear wheels, 3 a chain operatively connected to the rear wheels, 4 the pedals operatively connected to the chain for propelling the rear wheels.

My invention includes the frame 1 bent to form parallel strips 5 and 6 which have fixed thereto a U-shaped-brace 7 to which is pivotally connected a bolster 8 by a bolt 9. The bolster is fixed to the front axle 10 by rivets 11 or the like. A gear-rack 12 is riveted to the axle at 13 and is adapted to mesh with a gear 14 carried by a steering-post 15 journaled in a U-shaped bearing bracket 16 which is fixed to an inclined part 17 of a supporting-bracket 18. The supporting-bracket is riveted to the strips 5 and 6 of the frame 1. Wheels 19 are journaled on the ends of the axle in the usual manner. To rigidly connect the axle to the frame by its pivotal connection, I provide an axle-brace 20, one end of which is connected to the lower end of the pivot bolt 9 and the other end riveted to a cross-brace 21 which is connected to the strips 5 and 6 of frame 1 by bolts or the like. The axle brace 20 is preferably spaced from the axle by a spacer 22 so that the part 23 of the axle-brace will be clear of the gear and rack connection. A steering wheel 24 of any description is provided on the steering post to facilitate the turning of the post for steering.

When asembling my steering device, the U-shaped-brace 7 and the supporting-bracket 18 are riveted to the strips 5 and 6 of frame 1. The bearings are riveted to the inclined-part 17 of the supporting-bracket and the steering-post positioned in the bearings. The gear wheel 14 is then secured to the end of the post. The gear-rack is first riveted to the axle and then the bolster. The wheels applied to the end of the axle and the pivot bolt 9 passed through the U-shaped brace 7, the bolster, the gear-rack and the axle to pivotally connect the axle to the frame. The gear rack is so positioned that it will mesh with the gear 14. When the axle-brace 20 is connected to the bolt 9, spacer 22 is first slipped over the pivot bolt 9 against the underside of the axle and then one end of the axle-brace slipped over the bolt against the spacer. The nut is then screwed onto the bolt and locked in position. The other end of the axle brace is connected to the strips 5 and 6 by the cross-brace 21. The steering device is then ready for use.

When using my steering device, the steering wheel 24 is turned to the right to cause the axle to swing to the right and similarly when the steering wheel 24 is turned to the left, the axle will swing to the left, thus steering the pedacycle to the right or to the left. By making a steering device as above described a rigid and strong structure is provided which is not liable to break by the knocks received when used by a child.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A steering device including a frame; an axle pivoted to the frame; a gear rack fixed to the axle; a bracket fixed to the frame and having an inclined part; bearings fixed to the inclined part; a steering post journaled in the bearings, and a gear carried by the post and meshing with the gear rack.

2. A steering device including a frame; an axle; pivotal means connecting the frame and axle; an axle brace fixed to the frame and connected with the pivotal means; bearings fixed to the frame between the pivotal means and the axle brace; a steering post journaled in the bearings; a gear carried by the post, and a gear rack fixed to the axle and meshing with the rack.

3. A steering device including a frame; a U-shaped brace fixed to the frame; an axle; a bolster fixed to the axle; means for pivotally connecting the bolster to the U-shaped brace and passing through the axle; a cross brace secured to the frame; an axle brace fixed to the cross brace and connected to the pivotal means beneath the axle; a spacer on the pivotal means between the cross brace and the axle; a gear rack fixed to the axle; a steering post; bearings for the steering post fixed to the frame, and a gear carried by the steering post and meshing with the rack.

4. A steering device including a frame; an axle pivoted to the frame; wheels journaled on the axle; a gear rack fixed to the axle; a U-shaped bracket fixed to the frame and having an inclined part; bearings fixed to the inclined part; a steering post journaled in the bearings, and a gear carried by the post and meshing with the gear rack.

5. A steering device including parallel strips; a U-shaped brace fixed to the strips; an axle; means for pivotally connecting the axle to the U-shaped brace; a cross brace connecting the strips; an axle brace fixed to the cross brace and connected to the pivotal means; a gear rack fixed to the axle; a steering post; bearings for the steering post fixed to the parallel strips, and a gear carried by the steering post and meshing with the gear rack.

6. A steering device including parallel strips; a U-shaped brace fixed to the strips; an axle; a bolster fixed to the axle; means for pivotally connecting the bolster to the U-shaped brace; a cross brace connecting the strips; an axle brace fixed to the cross brace and connected to the pivotal means; a gear rack fixed to the axle; a steering post; bearings for the steering post fixed to the parallel strips, and a gear carried by the steering post and meshing with the gear rack.

In testimony whereof I have signed my name to this specification in the presence of two subscribing witnesses.

JOHN S. GABKE.

Witnesses:
ELIZABETH GARBE,
CHAS. E. POTTS.